Feb. 7, 1933.    D. H. BITNEY    1,896,279

STRUCTURAL UNIT AND ASSEMBLY

Filed Jan. 4, 1930

INVENTOR
Dewey H. Bitney
BY
Chappell Earl
ATTORNEYS

Patented Feb. 7, 1933

1,896,279

UNITED STATES PATENT OFFICE

DEWEY H. BITNEY, OF ALBION, MICHIGAN, ASSIGNOR TO UNION STEEL PRODUCTS COMPANY, OF ALBION, MICHIGAN, A CORPORATION OF MICHIGAN

STRUCTURAL UNIT AND ASSEMBLY

Application filed January 4, 1930. Serial No. 418,452.

The main objects of this invention are to provide a reinforce assembly comprising a beam with surrounding mesh reinforcing element and supports therefor which may be quickly and easily assembled in position to receive the concrete and is not likely to be displaced or distorted in the applying of the concrete.

A further object is to provide a structural unit for supporting reinforce valance in spaced relation to a beam or the like which may be very economically produced and very easily applied to the beam.

Objects relating to details and economies of my invention will appear from the description to follow. The invention is defined and pointed out in the claims.

A structure which is a preferred embodiment of my invention is illustrated in the accompanying drawing, in which.

In the embodiment of my invention illustrated in the accompanying drawing 1 represents an I-beam of a reinforce assembly.

Figure 3:
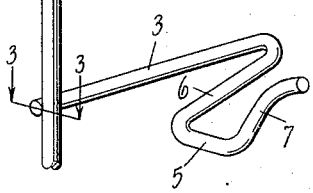
Fig. 3 is a detail view partially in section on line 3—3 of Fig. 2.
Figure 3:
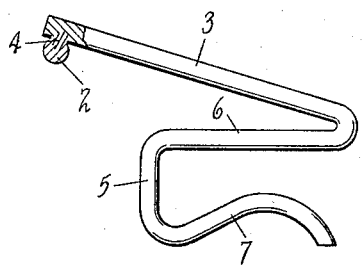

I provide a plurality of units each comprising a longitudinal rod 2 having a plurality of arms 3 welded thereto in transverse spaced relation, thereby providing a rigid connection for the arms to the rod, the weld being indicated at 4, Fig. 3.

Figure 2:
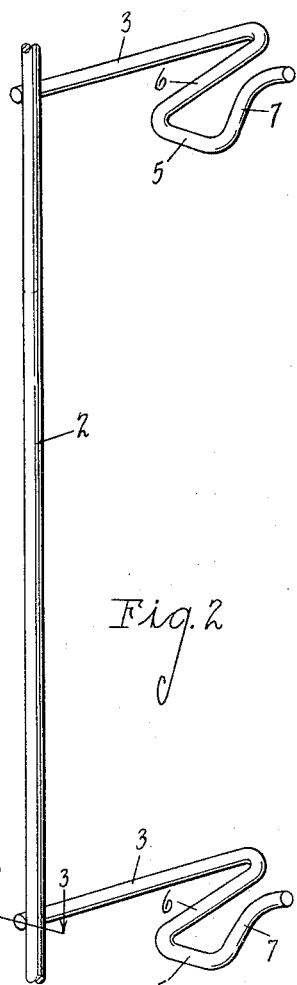
Fig. 2 is a fragmentary perspective view of one of the structural units or elements entering into the assembly.
Figure 1:
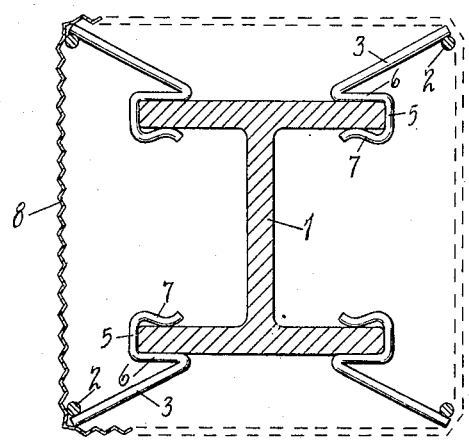
Fig. 1 is a horizontal section through a column reinforce assembly embodying the features of my invention.

These arms are conformed to provide U-shaped clips 5 facing away from the rod and adapted to be engaged with the flange or edge of a reinforcing beam as shown in Fig. 1.

The inner arms 6 of these clips are disposed at an angle to the arms so that when the clips are engaged with an edge of a beam as shown in Fig. 1, the rods 2 are supported in a plane at one side of the plane of the beam.

The outer arms 7 of the clips are inwardly directed and curved so that they form spring members for engaging the beam under spring tension, thereby securely retaining the clips in engagement with the beam and insuring a tight engagement.

Where an I-beam is employed, as in Fig. 1, four of the spacer units are provided, a mesh reinforce indicated conventionally at 8 being wrapped around the spacer elements.

This reinforce assembly may be quickly prepared for the concrete and is especially desirable for use in columns in which relation I have illustrated the same, but my improvements are adapted for use in various other relations.

Having thus described my invention, what I claim as new and desire to secure by Letters Patent, is:

1. A structural unit comprising a longitudinal rod, and a plurality of arms disposed transversely of and welded to said rod in spaced relation and terminating in laterally offset U-shaped clips facing away from the rod and disposed at an angle to the arms whereby the arms are supported at an angle to the part with which the clips are engaged, the outer arms of the clips being curved inwardly to provide springs and facilitate engagement of the clips.

2. A structural unit comprising exclusively a longitudinal rod, and a plurality of arms disposed transversely of and welded to said rod in spaced relation and terminating in laterally offset U-shaped spring clips facing away from the rod and disposed at an angle to the arms whereby the arms are supported at an angle to the part with which the clips are engaged.

3. A structural unit comprising a longitudinal rod, and a plurality of arms disposed transversely of and welded to said rod in spaced relation and terminating in U-shaped clips facing away from the rod, the outer arms of the clips being curved inwardly to provide springs and facilitate engagement of the clips.

4. A structural unit comprising exclusively a longitudinal rod, and a plurality of arms disposed in spaced relation transversely of the rod and terminating in offset U-shaped spring clips facing from the rod and disposed at an angle to the arms.

5. A structural unit comprising exclusively a longitudinal rod, and a plurality of arms disposed in spaced relation transversely of the rod and terminating in U-shaped spring clips facing from the rod.

6. A structural unit comprising exclusively a longitudinal rod, and a plurality of arms fixed to said rod in spaced transverse relation, the ends of the arms being conformed into U-shaped spring clips facing away from the rod.

7. A reinforce assembly comprising an I-beam, a plurality of self-supporting structural units each consisting of a longitudinal rod having a plurality of transversely disposed arms terminating in U-shaped spring clips engaging the flanges of the I-beam, the clips being disposed at an angle to the arms whereby the rods are supported in a diagonally spaced relation relative to the I-beam, and a meshed reinforcing element wrapped around said rods.

8. A reinforce assembly comprising an I-beam, a plurality of self-supporting structural units each consisting of a longitudinal rod having a plurality of transversely disposed arms terminating in U-shaped spring clips engaging the flanges of the I-beam, the clips being disposed at an angle to the arms whereby the rods are supported in a diagonally spaced relation relative to the I-beam.

9. A reinforce assembly comprising a beam, and a self-supporting structural unit consisting exclusively of a longitudinal rod having a plurality of transversely disposed arms thereon terminating in U-shaped spring clips engaging an edge of the beam, the clips facing away from the rod and being disposed at an angle to the arms whereby the rod is supported in spaced relation to the beam and in a plane spaced from the plane of the beam.

10. A reinforce assembly comprising a beam, and a self-supporting structural unit consisting exclusively of a longitudinal rod having a plurality of transversely disposed arms thereon terminating in U-shaped spring clips facing away from the rod and engaging an edge of the beam.

11. In a building construction, a flanged beam, spacing members engaging opposite sides of a flange thereof, a separate wrapping element surrounding the beam and engaged by the spacing members and held thereby spacedly away from all portions of said flange, and cementitious material surrounding the beam encasing the same, the spacing members and the wrapping element.

12. In a building construction, a flanged beam, spacing members formed with clasp portions and having said portions frictionally claspingly engaging opposite sides of a flange of said beam, a separate wrapping element surrounding the beam and engaged by the spacing members and held thereby spacedly away from all portions of said flange, and cementitious material surrounding the beam encasing the same, the spacing members and the wrapping element.

13. In a building construction, a flanged beam, a pair of spacing members engaging opposite sides of a flange thereof, each spacing member having a pair of spaced-apart spring metal clip portions, and an integral transverse portion joining the rear portions of the clip portions, a separate elongated, metallic wrapping element surrounding the beam and engaging and being supported by said transverse portions of the spacing members spacedly outwardly of all portions of said flange, and cementitious material surrounding the beam encasing the same, the spacing members and the wrapping element.

In witness whereof I have hereunto set my hand.

DEWEY H. BITNEY.